(12) United States Patent
Cardona et al.

(10) Patent No.: US 8,724,465 B2
(45) Date of Patent: May 13, 2014

(54) ZERO PACKET LOSS ENERGY EFFICIENT ETHERNET LINK TRANSITION VIA DRIVER FAST FAILOVER

(75) Inventors: Omar Cardona, Cedar Park, TX (US); James B. Cunningham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 12/607,373

(22) Filed: Oct. 28, 2009

(65) Prior Publication Data

US 2011/0096659 A1 Apr. 28, 2011

(51) Int. Cl.
*H04L 12/26* (2006.01)

(52) U.S. Cl.
USPC ............................................ 370/235; 370/252

(58) Field of Classification Search
None
See application file for complete search history.

(56) References Cited

U.S. PATENT DOCUMENTS

| | | | | |
|---|---|---|---|---|
| 5,822,531 | A | * | 10/1998 | Gorczyca et al. ............. 709/221 |
| 6,049,825 | A | * | 4/2000 | Yamamoto .................... 709/221 |
| 6,253,334 | B1 | * | 6/2001 | Amdahl et al. ............... 714/4.12 |
| 6,349,089 | B1 | * | 2/2002 | Bonomi et al. ............ 370/230.1 |
| 6,594,227 | B1 | * | 7/2003 | Ogawa et al. ................. 370/216 |
| 6,594,265 | B1 | | 7/2003 | Etorre et al. |
| 6,658,018 | B1 | * | 12/2003 | Tran et al. ..................... 370/465 |
| 6,687,228 | B1 | | 2/2004 | Fichou et al. |
| 6,690,678 | B1 | | 2/2004 | Basso et al. |
| 6,874,147 | B1 | | 3/2005 | Diamant |
| 7,062,595 | B2 | | 6/2006 | Lindsay et al. |
| 7,275,175 | B2 | | 9/2007 | Cardona et al. |
| 7,366,120 | B2 | | 4/2008 | Handforth et al. |
| 7,389,462 | B1 | | 6/2008 | Wang et al. |
| 7,506,214 | B2 | | 3/2009 | Anglin et al. |
| 7,743,129 | B2 | * | 6/2010 | Hua et al. ...................... 709/223 |
| 8,185,761 | B2 | * | 5/2012 | Diab et al. .................... 713/322 |
| 2007/0050426 | A1 | * | 3/2007 | Dubal et al. .................. 707/201 |
| 2008/0084828 | A1 | | 4/2008 | Gonzalez et al. |
| 2008/0126509 | A1 | * | 5/2008 | Subramanian et al. ....... 709/214 |
| 2011/0051734 | A1 | | 3/2011 | Cardona et al. |

OTHER PUBLICATIONS

"EtherChannel", htp://en.wikipedia.org/wiki/EtherChannel, last modified Aug. 18, 2009, 4 pages.
"Link aggregation", http://en.wikipedia.org/wiki/Link_aggregation, last modified Aug. 26, 2009, 6 pages.

(Continued)

*Primary Examiner* — Hassan Kizou
*Assistant Examiner* — Roberta A Shand
(74) *Attorney, Agent, or Firm* — Stephen J. Walder, Jr.; David A. Mims, Jr.

(57) ABSTRACT

A mechanism for zero packet loss with energy efficient Ethernet link transition via driver fast failover is provided. By default, the mechanism uses a primary adapter running at low speed with low energy usage and a secondary adapter that is disabled. This default configuration is used during periods of low link utilization. When system or input/output load is such that high speed is required, then the mechanism enables the secondary adapter to its highest supported link speed. All transmit traffic in progress running over the primary adapter will complete, and upon completion, the driver generates an address resolution request and sends the request over the secondary adapter. After this process completes, the primary adapter transitions to link down and zero packet loss transition completes.

20 Claims, 3 Drawing Sheets

(56) References Cited

OTHER PUBLICATIONS

"Understanding EtherChannel Load Balancing and Redundancy on Catalyst Switches", http://www.cisco.com/en/US/tech/tk389/tk213/technologies_tech_note09 . . Document ID 12023, Updated Jul. 9, 2007, 9 pages.

Lettieri, Paul et al., "Adaptive link layer strategies for energy efficient wireless networking", Wireless Networks 5, 1999, pp. 339-355.

Namboodiri, Vinod, "Towards Energy Efficient VoIP over Wireless LANs", MobIHoc '08, May 26-30, 2008, p. 169-178.

Raghunathan, Vijay et al., "Experience with a Low Power Wireless Mobile Computing Platform", ISLPED, Aug. 9-11, 2004, p. 363-368.

Soni, P.M. et al., "Analysis of Link-Layer Backoff Schemes on Point-to-Point Markov Fading Links", IEEE Transactions on Communications, vol. 51, No. 1, Jan. 2003, p. 29-32.

Cardona, Omar et al., "Energy Efficient Control of Data Link Groups", Attorney Docket No. AUS920090063US1. U.S. Appl. No. 12/553,158, filed Sep. 3, 2009, 25 pages.

U.S. Appl. No. 12/553,158, 2 pages.

\* cited by examiner

ZERO PACKET LOSS ENERGY EFFICIENT ETHERNET LINK TRANSITION VIA DRIVER FAST FAILOVER

BACKGROUND

The present application relates generally to an improved data processing apparatus and method and more specifically to an apparatus and method for achieving zero packet loss with energy efficient Ethernet link transition via driver fast failover.

Ethernet is the standard local area network (LAN) access method. Defined by the Institute of Electrical and Electronics Engineers (IEEE) as the 802.3 standard, Ethernet is used to connect computers in a company or home network, as well as to connect a single computer to a cable modem or digital subscriber line (DSL) modem for Internet access.

A 10/100 Ethernet port supports two speeds: 10 Mbps (10Base-T) and 100 Mbps (100Base-T). A 10/100/1000 port includes Gigabit Ethernet at 1 Gbps (1,000 megabits). In the past, Ethernet devices negotiated with each other and transmit at the highest speed possible. Energy Star compliance calls for Energy Efficient Ethernet by 2009. The current direction Ethernet is going to achieve this goal revolves around Adaptive Link Rate (ALR), which is not yet established as an IEEE standard.

Due to the bursty nature of Ethernet traffic, ALR consists of renegotiating the link to low speed during times of low utilization and renegotiating to high speed during heavy utilization. The problem at hand is that ALR will drive new hardware, switch and standards requirements that are not yet available.

Furthermore, a software based solution does not benefit from the draft proposals for hardware/protocol functionality. The link renegotiation requires a link reset, which takes several hundred milliseconds and results in packet drops. The number of packet drops will be proportionate to the line speed (e.g., 10/100/1000/10000 Mbps). Latency sensitive applications, such as streaming traffic from voice over Internet protocol (VoIP) and streaming video, high performance computing (HPC), and non-TCP/IP protocols, are impacted by high latency resulting from dropped packets. Once ALR is in place, it can provide a very fast transition through hardware and protocol functionality, a transition of approximately 10 ms; however, ALR cannot guarantee zero packet loss.

SUMMARY

In one illustrative embodiment, a method is provided in a data processing system for energy efficient link transition with zero packet loss. The method comprising activating a primary network adapter in low power mode, disabling a secondary network adapter, and configuring a switch that is coupled to the primary network adapter and the secondary network adapter to route incoming traffic from a sender to the primary network adapter. The method further comprises, responsive to detecting high utilization of the primary network adapter, activating the secondary network adapter in high speed mode, completing all in-process transmit requests over the primary network adapter, configuring the switch to route data to and from the secondary network adapter, and disabling the primary network adapter.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus comprises a network interface device. The network interface device comprises a primary network adapter, a secondary network adapter, and a switch that is coupled to the primary network adapter and the secondary network adapter. The apparatus further comprises a device driver associated with the network interface device and a utilization detection component. The device driver is configured to activate the primary network adapter in low power mode, disable the secondary network adapter, and configure the switch to route incoming traffic from a sender to the primary network adapter. The device driver is configured to activate the secondary network adapter in high speed mode, complete all in-process transmit requests over the primary network adapter, configure the switch to route data to and from the secondary network adapter, and disable the primary network adapter responsive to the utilization detection component detecting high utilization of the primary network adapter.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for zero packet loss with energy efficient Ethernet link transition via driver fast failover. The mechanism achieves high efficiency by having a primary adapter (PA) running at a low speed with low energy usage and a secondary adapter (SA) running at a high speed with higher energy usage. By default, the mechanism uses the primary adapter running at low speed with low energy usage and the secondary adapter is disabled. This default configuration is used during periods of low link utilization.

When system or input/output (IO) load is such that high speed is required, then the mechanism enables the secondary adapter to its highest supported link speed. All transmit (TX) traffic in progress running over the primary adapter will complete and upon completion, the driver generates an address resolution protocol (ARP) packet and sends the packet over the secondary adapter. The ARP packet notifies the switch of the new location for the media access control (MAC) address. After this process completes, the primary adapter transitions to link down (0 W) and zero packet loss transition completes.

The system will run under this configuration until the mechanism enforces negotiation back down to low speed and low power mode, at which point the same process occurs for a transition from the secondary adapter to the primary adapter. A method/policy to determine when to transition to higher speed link based on system load is implementation specific; therefore, the mechanism may transition between links based on driver tracking of RX/TX packets per time interval or by policy enforcement via application notification to the driver via an IO control (IOCTL) function.

Figure 1:
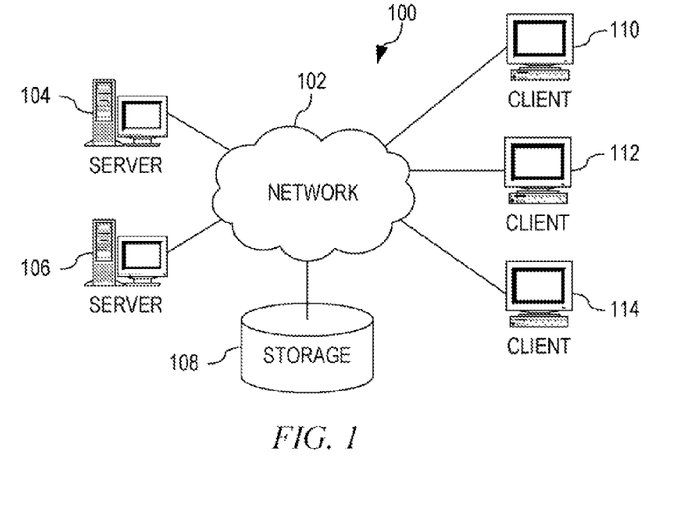
FIG. 1 depicts a pictorial representation of an example distributed data processing system in which aspects of the illustrative embodiments may be implemented.
Figure 2:
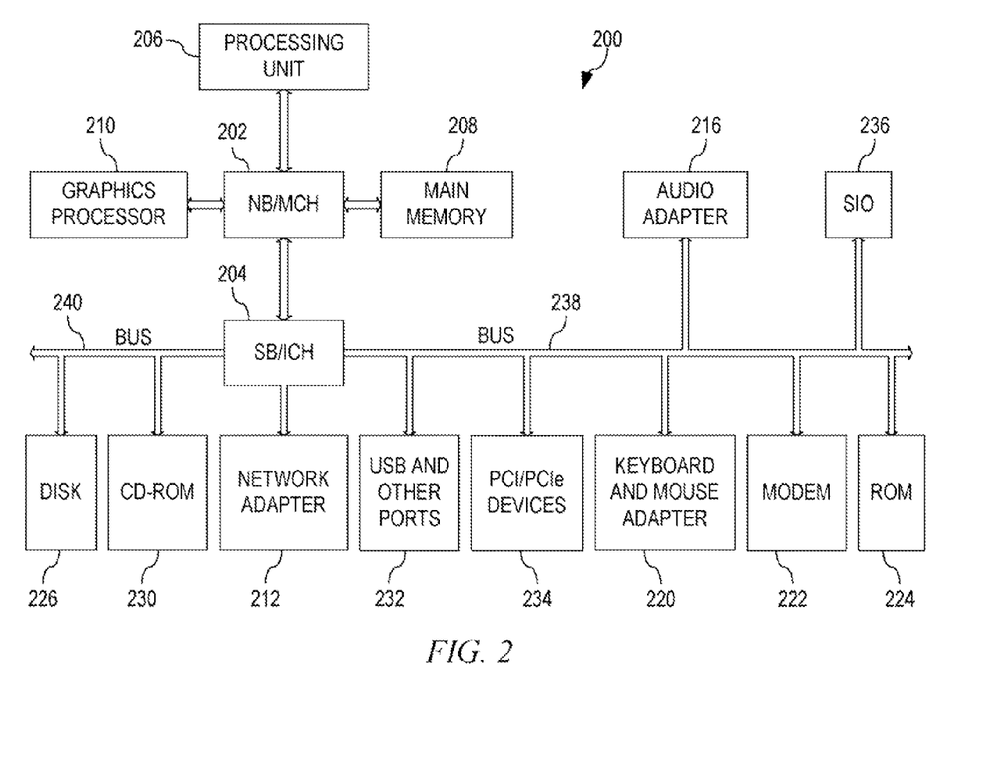
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments in which components of the distributed data processing system require energy efficient link transition with zero packet loss.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also Connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

In accordance with an illustrative embodiment, network adapter 212 in FIG. 2 may comprise a mechanism for zero packet loss with energy efficient Ethernet link transition via driver fast failover. The mechanism achieves high efficiency by including in network adapter 212 a primary adapter (PA) running at a low speed with low energy usage and a secondary adapter (SA) running at a high speed with higher energy usage. By default, the mechanism uses the primary adapter running at low speed with low energy usage and the secondary adapter is disabled. This default configuration is used during periods of low link utilization.

When system or input/output (IO) load is such that high speed is required, then the mechanism enables the secondary adapter to its highest supported link speed. All transmit (TX) traffic in progress running over the primary adapter will complete. After this process completes, the primary adapter transitions to link down (0 W) and zero packet loss transition completes. The system will run under this configuration until the mechanism enforces negotiation back down to low speed and low power mode, at which point the same process occurs for a transition from the secondary adapter to the primary adapter.

Figure 3:
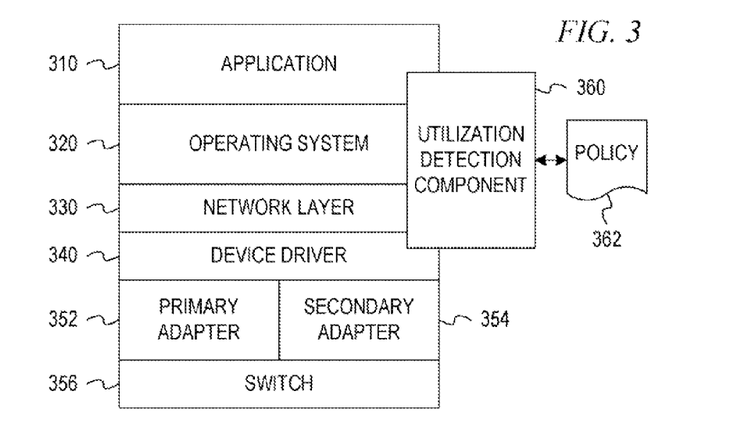
FIG. 3 is a block diagram depicting the various layers in a data processing system with zero packet loss with energy efficient Ethernet link transition via driver fast failover in accordance with an illustrative embodiment.

FIG. 3 is a block diagram depicting the various layers in a data processing system with zero packet loss with energy efficient Ethernet link transition via driver fast failover in accordance with an illustrative embodiment. Application 310 runs on operating system 320 and generates Ethernet traffic by sending and receiving data. For example, application 310 may be an email client, a file transfer client, a Web browser, a video streaming application or plugin, a voice over IP (VoIP) client, or the like.

Network layer 330 exists above device driver 340. The network layer links operating system 320 to the network (i.e. peripheral) device via device driver 340. Device driver 340 is a program routine that interacts with the hardware layer, which in the depicted embodiment is the combination of primary adapter 352, secondary adapter 354, and switch 356. Network layer 330 provides the protocol that interacts with the hardware layer, which includes primary adapter 352, secondary adapter 354, and switch 356.

Primary adapter (PA) 352 is a low speed, low power Ethernet adapter. For example, primary adapter 352, when enabled, may run at 100 Mbps and less than 1 W power. Secondary adapter (SA) 354 is a higher speed, higher power Ethernet adapter. For example, secondary adapter 354 may run at 1 GbE/10 GbE and about 2.5 W/14 W power. In a default configuration, primary adapter 352 is configured to run at a low speed/low power, secondary adapter 354 is link disabled (0 W), and switch 356 is configured to route receive (RX) and transmit (TX) traffic to and from primary adapter 352. Thus, in the default configuration, primary adapter 352 and secondary adapter 354 are running at a total of less than 1 W power. The mechanism of the illustrative embodiment uses the default configuration during periods of low link utilization.

The mechanism of the illustrative embodiment includes a utilization detection component 360 that may be embodied within device driver 340, network layer 330, operating system 320, or application 310. The detection component 360 detects when link utilization reaches a level requiring a high speed link. Detection component 360 may use a metric, such as a number of TX or RX packets per second, to determine when link utilization reaches a level requiring a transition. Detection component 360 may determine a value for the metric and compare the value to a threshold, for example. A user may configure detection component 360 by defining the metric and selecting the threshold in a policy data structure 362.

When detection component 360 determines that system or IO load is such that a high speed is required, device driver 340 enables secondary adapter 354 to its highest supported link speed. Thus secondary adapter 354 may transition from link down (0 W) to 1 GbE/10 GbE (~2.5 W/~14 W). Upon completion of all transmit (TX) traffic in progress running over primary adapter 352, device driver 340 generates an address resolution protocol (ARP) packet and sends the packet over secondary adapter 354. The ARP packet notifies switch 356 of the new location for the media access control (MAC) address. After this process completes, primary adapter 352 transitions to link down (0 W) and zero packet loss transition completes.

The mechanism runs under this high utilization configuration until the mechanism enforces negotiation back down to low speed and low power mode, the default configuration, at which point the same process occurs for a transition from secondary adapter 354 to primary adapter 352. The policy to determine when to transition to higher speed link based on system load is implementation specific; therefore, the mechanism may transition between links based on driver tracking of RX/TX packets per time interval or by policy enforcement via application notification to the driver via an IO control (IO-CTL) function.

Figure 4A:
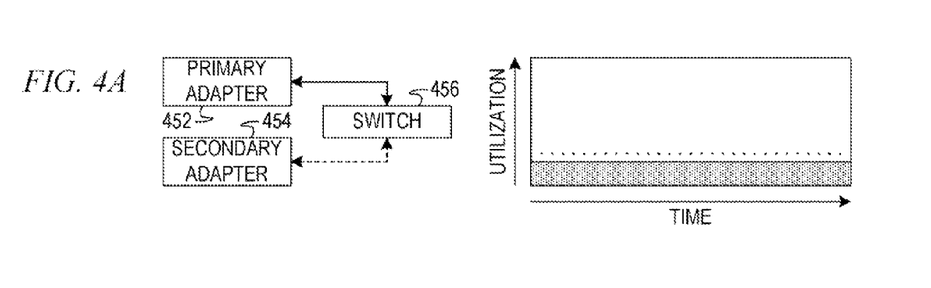
FIGS. 4A-4C depict an example implementation of a mechanism for zero packet loss with energy efficient Ethernet link transition via driver fast failover in accordance with an illustrative embodiment.
Figure 4B:
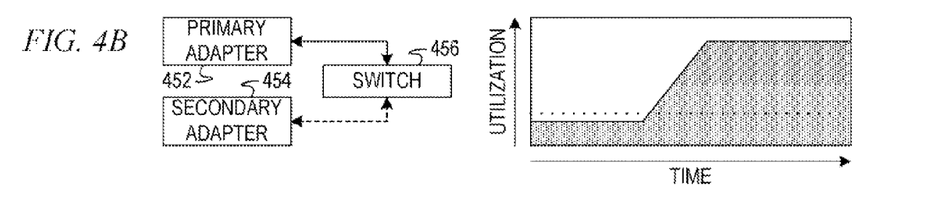
Figure 4C:
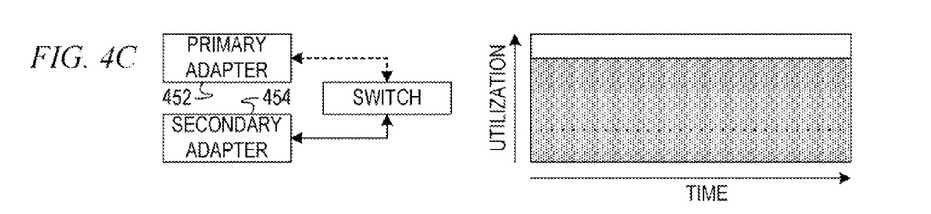

FIGS. 4A-4C depict an example implementation of a mechanism for zero packet loss with energy efficient Ethernet link transition via driver fast failover in accordance with an illustrative embodiment. In FIG. 4A, primary adapter 452 is active in low power mode (100 Mbps@<1 W). All TX/RX data are flowing normally, because the utilization rate does not reach a predetermined threshold. Secondary adapter 454 is not active, and there is no power consumption on the secondary adapter link. Switch 456 routes all incoming traffic to primary adapter 452.

In FIG. 4B, primary adapter 452 is active in low power mode and the link utilization threshold is reached. The mechanism initiates a transition to high link speed. The mechanism of the illustrative embodiment activates the link on secondary adapter 454 and negotiates to 1 GbE/10 GbE (2.5 W/14 W). Primary adapter 452 completes all in-process transmit requests. Once complete, the device driver generates an ARP request from secondary adapter 454. The ARP request notifies switch 456 that the MAC address is now on a new port. Switch 456 then routes all incoming traffic to secondary adapter 454. The device driver routes any new transmit packets from the stack to secondary adapter 454. The mechanism updates the driver status. The mechanism may update the driver status by putting a notification in a log that the user can see.

In FIG. 4C, secondary adapter 454 is active at full speed and power. Primary adapter 452 is inactive with no power consumption on the primary adapter link. At the point of FIG. 4C, energy efficient Ethernet link transition is complete with zero packet loss. Once the utilization level changes such that the high speed mode is no longer required, the same steps are performed to transition from secondary adapter 454 to primary adapter 452.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
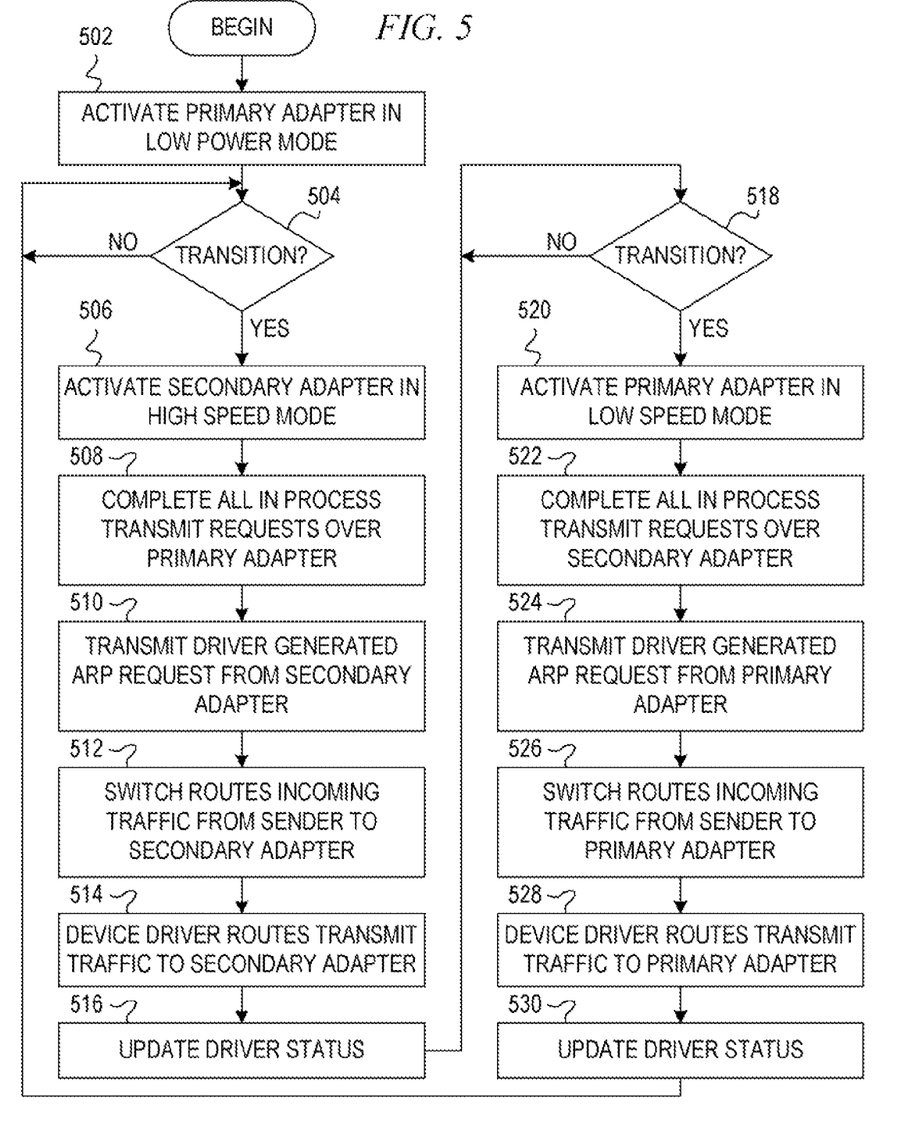
FIG. 5 provides a flowchart outlining example operations of a mechanism for zero packet loss with energy efficient Ethernet link transition via driver fast failover in accordance with an illustrative embodiment.

FIG. 5 provides a flowchart outlining example operations of a mechanism for zero packet loss with energy efficient Ethernet link transition via driver fast failover in accordance with an illustrative embodiment. Operation begins, and the mechanism activates a primary adapter in low power mode (block 502). The mechanism then determines whether system or IO load is such that a transition to a high speed link is required (block 504). If the mechanism determines that a transition is not required, operation returns to block 504 until the utilization level reaches a utilization threshold or other policy criteria are met.

If the mechanism determines that a transition is required in block 504, the mechanism activates a second adapter in high speed mode (block 506). The mechanism completes all in-process transmit requests over the primary adapter (block 508). Then, the secondary adapter transmits a driver generated address resolution protocol (ARP) request to the switch (block 510). The switch routes incoming traffic from the sender to the secondary adapter (block 512), and the device driver routes transmit traffic to the secondary adapter (block 514). Then, the mechanism updates the driver status (block 516).

Thereafter, the mechanism determines whether system or IO load is such that high speed link is no longer required (block 518). If the mechanism determines that a transition is not required, operation returns to block 518 until the utilization level falls below the utilization threshold.

If the mechanism determines that a transition is required in block 518, the mechanism activates the primary adapter in low speed mode (block 520). The mechanism completes all in-process transmit requests over the secondary adapter (block 522). Then, the primary adapter transmits a driver generated ARP request to the switch (block 524). The switch routes incoming traffic from the sender to the primary adapter (block 526), and the device driver routes transmit traffic to the primary adapter (block 528). Then, the mechanism updates the driver status (block 530). Thereafter, operation returns to block 504 to determine whether a transition to high speed mode is required.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for zero packet loss with energy efficient Ethernet link transition via driver fast failover. The mechanism achieves high efficiency by having a primary adapter (PA) running at a low speed with low energy usage and a secondary adapter (SA) running at a high speed with higher energy usage. By default, the mechanism uses the primary adapter running at low speed with low energy usage and the secondary adapter is disabled. This default configuration is used during periods of low link utilization.

When system or input/output (JO) load is such that high speed is required, then the mechanism enables the secondary adapter to its highest supported link speed. All transmit (TX) traffic in progress running over the primary adapter will complete and upon completion, the driver generates an address resolution protocol (ARP) packet and sends the packet over the secondary adapter. The ARP packet notifies the switch of the new location for the media access control (MAC) address. After this process completes, the primary adapter transitions to link down (0 W) and zero packet loss transition completes.

The system will run under this configuration until the mechanism enforces negotiation back down to low speed and low power mode, at which point the same process occurs for a transition from the secondary adapter to the primary adapter. A method/policy to determine when to transition to higher speed link based on system load is implementation specific; therefore, the mechanism may transition between links based on driver tracking of RX/TX packets per time interval or by policy enforcement via application notification to the driver via an IO control (IOCTL) function.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for energy efficient link transition with zero packet loss, the method comprising:

activating a primary network adapter in low power mode;

disabling a secondary network adapter;
configuring a switch that is coupled to the primary network adapter and the secondary network adapter to route incoming traffic from a sender to the primary network adapter; and
responsive to detecting high utilization of the primary network adapter, activating the secondary network adapter in high speed mode, completing all in-process transmit requests over the primary network adapter, configuring the switch to route data to and from the secondary network adapter, and disabling the primary network adapter.

2. The method of claim 1, wherein detecting high utilization of the primary network adapter comprises:
determining a value of a metric;
comparing the value of the metric to a threshold; and
responsive to the value of the metric exceeding the threshold, detecting high utilization of the primary network adapter.

3. The method of claim 2, wherein the metric is a number of transmit or receive packets within a predetermined time interval.

4. The method of claim 1, further comprising:
responsive to detecting high utilization of the primary network adapter, generating, by a device driver, an address resolution protocol request; and
sending the address resolution protocol request from the secondary network adapter to the switch, wherein the address resolution protocol request notifies the switch of a new location for a media access control address.

5. The method of claim 1, further comprising:
responsive to detecting high utilization of the primary network adapter, routing, by a device driver, transmit traffic to the secondary network adapter.

6. The method of claim 1, further comprising:
responsive to detecting high utilization of the primary network adapter, updating a driver status.

7. The method of claim 1, further comprising:
responsive to detecting low utilization of the secondary network adapter, activating the primary network adapter in low power mode, completing all in-process transmit requests over the secondary network adapter, configuring the switch to route data to and from the primary network adapter, and disabling the secondary network adapter.

8. The method of claim 7, wherein detecting low utilization of the secondary network adapter comprises:
determining a value of a metric;
comparing the value of the metric to a threshold; and
responsive to the value of the metric falling below the threshold, detecting low utilization of the secondary network adapter.

9. The method of claim 7, further comprising:
responsive to detecting low utilization of the secondary network adapter, generating, by a device driver, an address resolution protocol request; and
sending the address resolution protocol request from the primary network adapter to the switch, wherein the address resolution protocol request notifies the switch of a new location for a media access control address.

10. The method of claim 7, further comprising:
responsive to detecting low utilization of the secondary network adapter, routing, by a device driver, transmit traffic to the primary network adapter.

11. A computer program product comprising a computer readable storage medium having a computer readable program stored therein, wherein the computer readable program, when executed on a computing device, causes the computing device to:
activate a primary network adapter in low power mode;
disable a secondary network adapter;
configure a switch that is coupled to the primary network adapter and the secondary network adapter to route incoming traffic from a sender to the primary network adapter; and
responsive to detecting high utilization of the primary network adapter, activating the secondary network adapter in high speed mode, complete all in-process transmit requests over the primary network adapter, configure the switch to route data to and from the secondary network adapter, and disable the primary network adapter.

12. The computer program product of claim 11, wherein detecting high utilization of the primary network adapter comprises:
determining a value of a metric;
comparing the value of the metric to a threshold; and
responsive to the value of the metric exceeding the threshold, detecting high utilization of the primary network adapter.

13. The computer program product of claim 12, wherein the metric is a number of transmit or receive packets within a predetermined time interval.

14. The computer program product of claim 11, wherein the computer readable program further causes the computing device to:
responsive to detecting high utilization of the primary network adapter, generate, by a device driver, an address resolution protocol request; and
send the address resolution protocol request from the secondary network adapter to the switch, wherein the address resolution protocol request notifies the switch of a new location for a media access control address.

15. The computer program product of claim 11, wherein the computer readable program further causes the computing device to:
responsive to detecting high utilization of the primary network adapter, route, by a device driver, transmit traffic to the secondary network adapter.

16. The computer program product of claim 11, wherein the computer readable program further causes the computing device to:
responsive to detecting low utilization of the secondary network adapter, activate the primary network adapter in low power mode, complete all in-process transmit requests over the secondary network adapter, configure the switch to route data to and from the primary network adapter, and disable the secondary network adapter.

17. An apparatus, comprising:
a network interface device, wherein the network interface device comprises a primary network adapter, a secondary network adapter, and a switch that is coupled to the primary network adapter and the secondary network adapter;
a device driver associated with the network interface device; and
a utilization detection component,
wherein the device driver is configured to activate the primary network adapter in low power mode, disable the secondary network adapter, and configure the switch to route incoming traffic from a sender to the primary network adapter; and
wherein the device driver is configured to activate the secondary network adapter in high speed mode, complete all in-process transmit requests over the primary network adapter, configure the switch to route data to and from the secondary network adapter, and disable the primary network adapter responsive to the utilization detection component detecting high utilization of the primary network adapter.

18. The apparatus of claim 17, wherein the utilization detection component is configured to detect high utilization of the primary network adapter by:
   determining a value of a metric;
   comparing the value of the metric to a threshold; and
   responsive to the value of the metric exceeding the threshold, detecting high utilization of the primary network adapter.

19. The apparatus of claim 17, wherein the device driver is configured to generate an address resolution protocol request responsive to the utilization detection component detecting high utilization of the primary network adapter, and send the address resolution protocol request from the secondary network adapter to the switch, wherein the address resolution protocol request notifies the switch of a new location for a media access control address.

20. The apparatus of claim 17, wherein the device driver is configured to activate the primary network adapter in low power mode, complete all in-process transmit requests over the secondary network adapter, configure the switch to route data to and from the primary network adapter, and disable the secondary network adapter responsive to the utilization detection component detecting low utilization of the secondary network adapter.

* * * * *